United States Patent Office 3,392,622
Patented July 16, 1968

3,392,622
ELECTROMAGNETIC ROTATION SENSOR
Henry R. Senf, Encino, Calif., assignor to Hughes Aircraft Company, a corporation of Delaware
Filed June 9, 1964, Ser. No. 373,723
4 Claims. (Cl. 88—14)

ABSTRACT OF THE DISCLOSURE

This is a rotation rate sensor including a rotatably mounted interferometer arrangement wherein two contrarotating coherent light beams define a closed optical loop. A portion of this optical energy is sampled to provide an output signal proportional to the difference in frequency between the contrarotating beams. An optical phase shifter is also disposed in the path of the closed loop to reversibly change the effective path length of one of the beams with respect to the other. Also included is a digital circuit coupled to the phase shifter and responsive to the output signal for purposes of measuring the frequency and phase relationship of the contrarotating beams to provide the angular rate and direction of rotation of the sensor.

---

The present invention relates to an electromagnetic rotation sensor and more particularly to a self-contained angular rotation sensor.

It has long been desired to measure accurately angular rotation within a self-contained system. Existing inertial guidance components have, by virtue of large sums spent on their research and development, attained a truly remarkable degree of accuracy. Nevertheless, long-term drift of these instruments sets a limit to their usefulness for space operations.

In the past, the measurement of angular rotation was performed mainly by gyroscopes, which suffer from a lack of sensitivity or ability to detect extremely small angular velocities. Thereafter, much interest was directed toward the possibility of measuring rotation by light propagation effects within a self-contained system. Whereas gyroscopes operate on the principle that due to their high angular momentum, they have a high inertia or resistance to torques perpendicular to the spin axis, the use of the phenomenon of the interference of light waves provides a much higher degree of sensitivity.

The use of light waves in this manner is not new. The fact that a rotation in inertial space could be measured by the interference of light waves was first discussed in 1913 by G. Sagnac in an article entitled: "Interferometer in Rotation Demonstrates a Relative Ether Wind," published in Comptes Rendus, Paris, France (1913) 157, 708–710.

Sagnac and others found that the fringe pattern of a revolving interferometer was shifted in position from the pattern observed when the interferometer was stationary. In a later experiment A. A. Michelson and H. G. Gale utilized this effect to measure the rate of rotation of the earth ("The Effect of the Earth's Rotation on the Velocity of Light," Astrophysics Journal 61, 140–145 (1925)). However, the ultimate sensitivity of a rotation sensor which relies on the fringe shift phenomenon is severely limited by the problem of measurement of small fringe shifts. Because of the nature of this type of system, it cannot be envisioned that a fringe shift of less than $10^{-4}$ could be detected even with the most sophisticated techniques of measurement. With this fringe shift capability, the detection of the earth's rotation ($\Omega \cong 10°$/hr. at the latitude of Los Angeles $\cong 40°$) would require an interferometer area of 150 m.[2] (assuming a 1 micron ($\mu$) light source). It is apparent that a rate of rotation sensor which relies on the fringe shift phenomenon can never hope to compete with present-day inertial guidance systems which have operational capability of 0.01°/hr. or better.

Recently, work has been done to determine whether a more sensitive electromagnetic rate of rotation sensor could be realized by observing the beat frequency obtained when the output of a rotating regenerative circulatory laser is mixed on a photosurface. Here, a typical example is an optical resonator consisting of four mirrors at the corners of a square one meter on a side with a laser, projecting light axially in both directions, mounted between any two of the mirrors. In this system, the transit time difference $\Delta \tau$ for the signals circulating in opposite senses is equivalent to a length difference $c\Delta \tau$ in the optical paths for these signals. Consequently, each mode of a stationary laser will split into two modes when the system is rotated. In the case of the device described immediately above, the rotation of the earth will split each of the axial modes of a $1\mu$ laser into two lines 50 cycles apart. In order to measure rates of rotation as small as 0.01°/hr. (comparable to present inertial guidance systems), the above system would have to be capable of resolving mode lines separated by 0.05 cycle per second, the difficulty of which will be described later.

The above-described laser interferometer differs from the original Michelson-Sagnac type in that it requires high reflectance mirrors in order to form a high Q resonant cavity for light. The effect of rotation on the cavity is to shorten and lengthen the effective path for oppositely-directed beams, respectively, as a function of the rate of rotation or angular velocity and hence cause a relative shift in the resonant frequencies of the cavity. It is clear that the resonance condition for a given sense of direction is determined by the phase relationship over the closed optical path.

With rotation this interferometer resembles a Fabry Perot with axial modes spaced about 80 mc. apart. These axial modes will have a width $$\Delta v_\text{c} = \frac{c}{L} \frac{f}{\pi} \qquad (1)$$

where L is the path around, c is the speed of light and f is the combined fractional energy loss per transit. Assuming $f \cong 8\%$, then $\Delta v_\text{c} \cong 1$ mc. If now a gain medium such as a He-Ne laser mixture is inserted into the arms of the interferometer, there is provided a laser (no rotation) oscillating in as many modes as is consistent with the gain line width, etc. The oscillation line width is much narrower than the passive cavity line width of 1 mc.

The effect of the earth's rotation introduces a path difference $\Delta L$ as a function of the angular rate between the two possible directions and in principle sets up two modes of different frequencies differing by $$\Delta v/v = \Delta L/L \qquad (2)$$

It has been found that $$\Delta L = \frac{4\Omega S}{c} \qquad (3)$$

where S is the area enclosed, $\Omega$ is the angular rotation rate (9.6°/hr. at 40° latitude) and c is the velocity of light. Choosing $v$ appropriate to the $1.1\mu$ laser line in He-Ne and assuming a system about 1 meter in linear size, it is found that $\Delta\nu \cong 45$ c.p.s. is the relative splitting due to rotation of the earth. This frequency difference could, in principle, be detected by mixing the two modes on a photocathode and observing the beat frequency photocurrent. Alternatively, the frequency shift could be detected similarly by mixing one or both of the shifted modes with an external laser unaffected by rotation. However, due to noise limitations inherent in the latter method the first method is preferred.

A serious disadvantage in using the mode-splitting system described above has been the problem of mode-pulling. A good discussion of this detrimental effect is found in two articles by W. R. Bennett, Jr.: "Gaseous Optical Maasers," Applied Optics Supplement 1, 24 (1962); and "Hole Burning Effects in the He-Ne Optical Maser," Physics Review 126, 580 (1962). One important result of mode-pulling is that simultaneous oscillation in two modes spaced by less than the natural line width is an unstable situation and the one mode having the most power initially may suppress the other mode. There may be other hysteresis effect as well as frequency locking effects due to time dependent nonlinearities in the amplifying medium.

Even more recently, the problem of mode-pulling has been attacked by introducing into one of the interferometer arms some anisotropic medium such as a Kerr cell. The function of the Kerr cell was to introduce a phase difference between different polarizations of the laser beam. However, this presented the new problem of requiring that the laser be capable of supporting all modes of polarization, which modern efficient lasers utilizing, for example, Brewster windows, cannot do.

As can be seen from the above, it would be highly desirable to have a rotation sensor which would not be susceptible to these mode-pulling and polarization problems and would also provide a method for indicating the sense of rotation which was not heretofore available.

Accordingly, it is an object of the present invention to provide an improved electromagnetic rotation sensor capable of sensing very slow angular rates of rotation.

It is another object of the invention to provide an extremely accurate self-contained electromagnetic rate of rotation sensor which also indicates the sense of rotation.

It is still another object of the present invention to provide an accurate mode-splitting type electromagnetic rate of rotation sensor which is free from mode-pulling effects.

It is yet another object of the invention to provide a stable self-contained electromagnetic rate of rotation sensor utilizing a laser which need only support a single mode of polarization.

These and other objectives are achieved in an electromagnetic rotation sensor according to one embodiment of this invention comprising a rotatably mounted interferometer arrangement including a coherent light energy source and a closed optical circuit defining a predetermined area where the light source produces two coherent light energy beams which travel around the closed optical circuit in opposite directions along identical paths. At least a portion of the energy of the light beams is sampled and detected to provide an output indicating the difference in frequency between the contrarotating beams. Also, the sensor includes a reversible nonreciprocal optical phase shifter disposed in the closed optical path for reversibly changing the effective optical circuit length of at least one of the light beams with respect to the other.

The invention and specific embodiments thereof will be described hereinafter by way of example and with reference to the accompanying drawings, in which.

Figure 1:
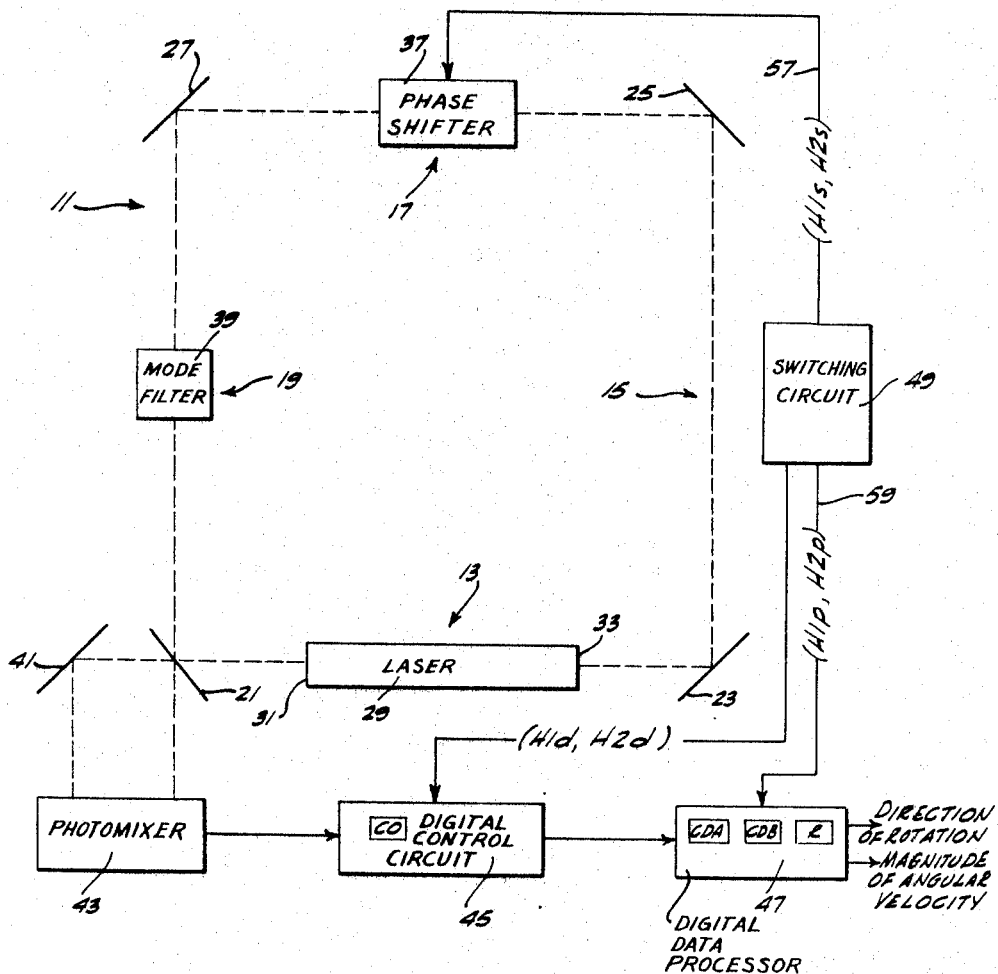
FIG. 1 is a block diagram of a preferred embodiment of an electromagnetic rate of rotation sensor according to the present invention.
Figure 3A:
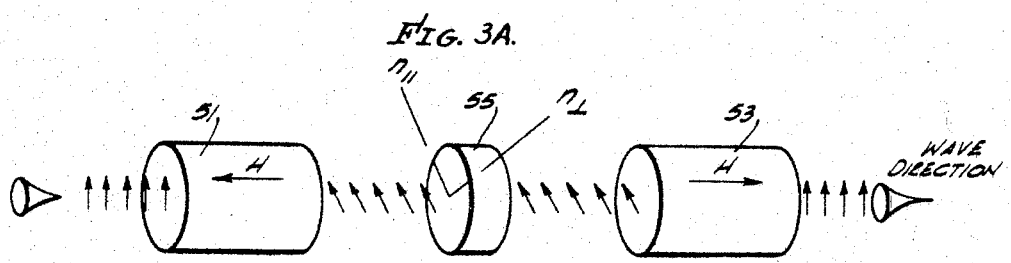
Figure 3B:
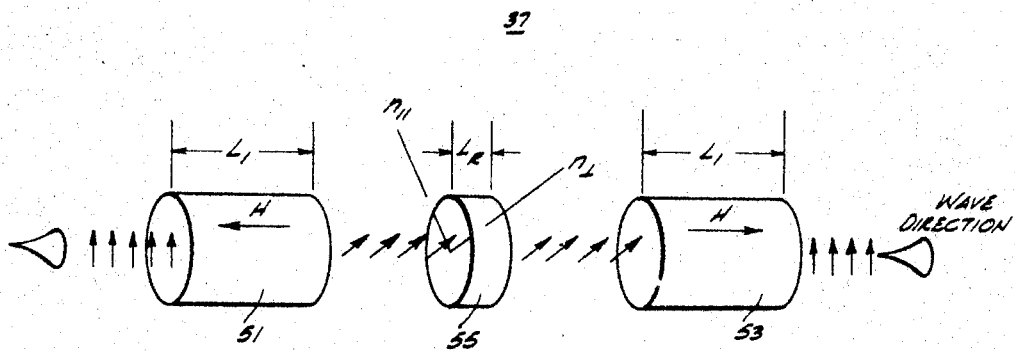
Figure 4A:
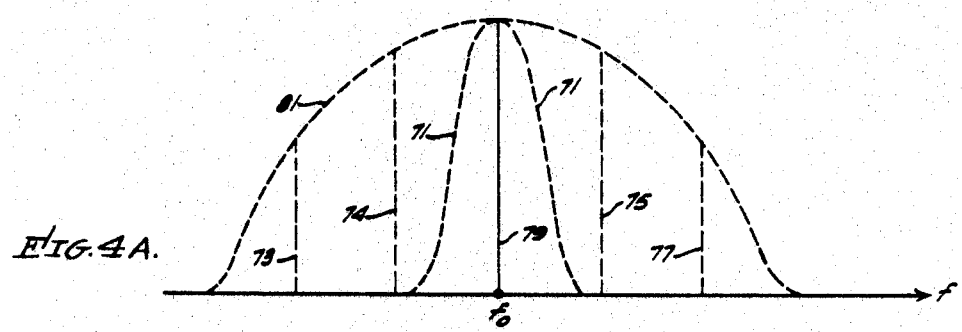
Figure 4B:
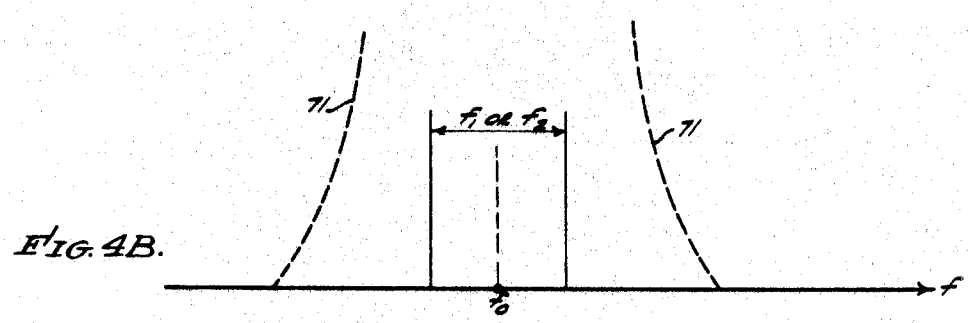
Figure 4C:
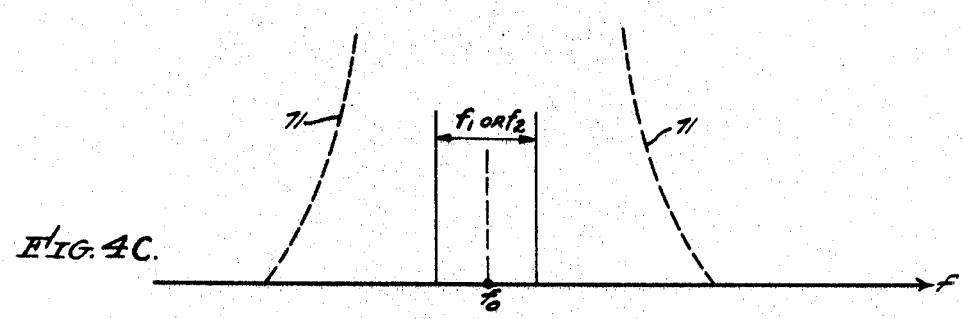
Figure 4D:
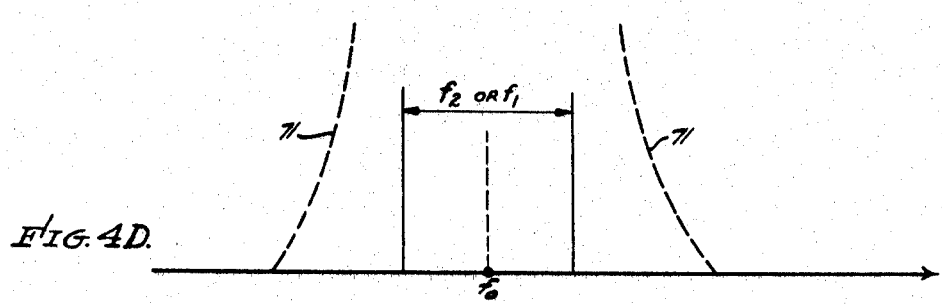
Figure 5:
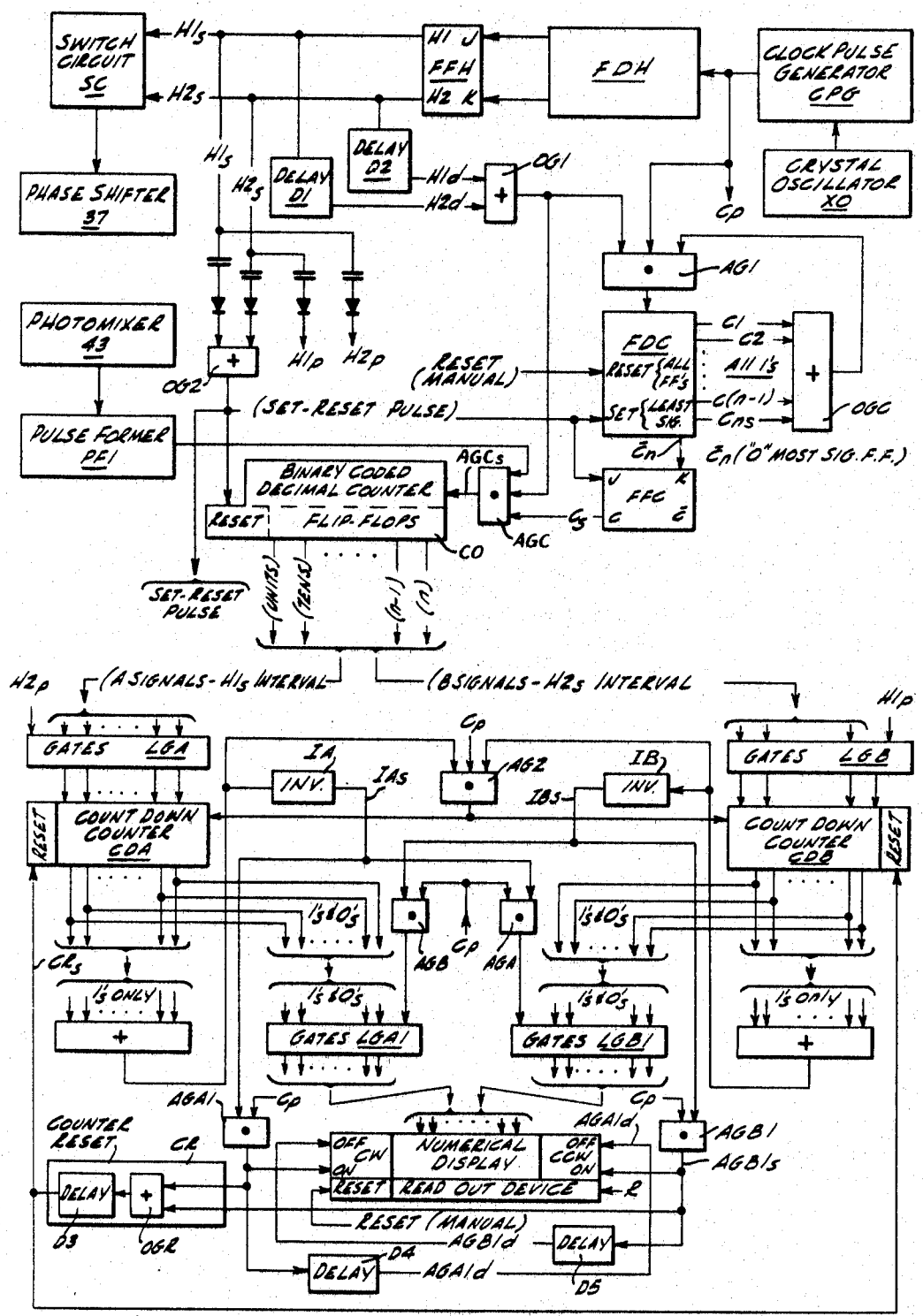
Figure 6:
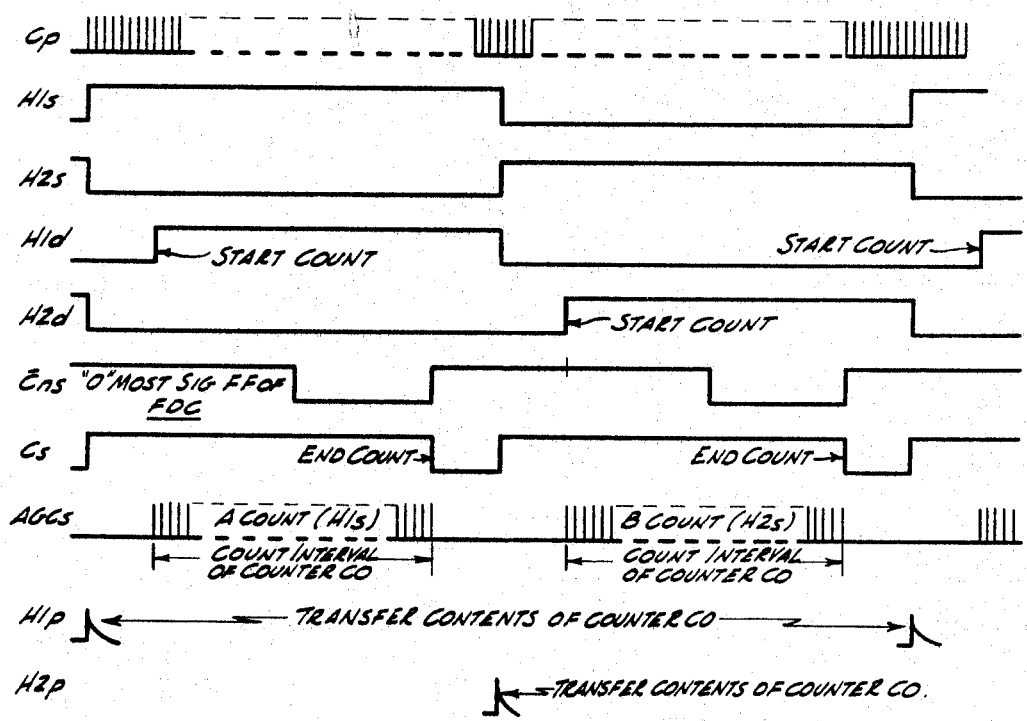

FIGS. 3A and 3B each schematically illustrate one type of reversible nonreciprocal optical phase shifter for use in the rotation sensor of FIG. 1, FIG. 3A showing the light wave in one direction and FIG. 3B showing the light wave in the opposite direction;

FIGS. 4A through 4D are graphs indicating frequency shifts for the sensor of FIG. 1. Specifically, FIG. 4A is the output spectrum without rotation but without the reversible nonreciprocal optical phase shifter; FIG. 4B is the output spectrum (expanded frequency scale) without rotation with the optical phase shifter in the system; and FIGS. 4C and 4D are output spectrums (expanded frequency scale) with some angular rotation and the optical phase shifter in the system;

FIG. 5 is a block diagram of a digital or discrete signal circuit for counting frequency and indicating the magnitude of the angular rate sensed by the electromagnetic sensor and for indicating the direction of rotation; and FIG. 6 is a timing signal diagram illustrating the relationship of certain key signals in the circuit.

Referring to the drawings in which like elements throughout the various figures are designated by like reference characters, and referring now particularly to FIG. 1, there is shown an electromagnetic rate of rotation sensor comprising a square interferometer configuration 11 having four interferometer arms 13, 15, 17 and 19 equal in length between four mirrors 21, 23, 25 and 27, respectively.

Figure 2:
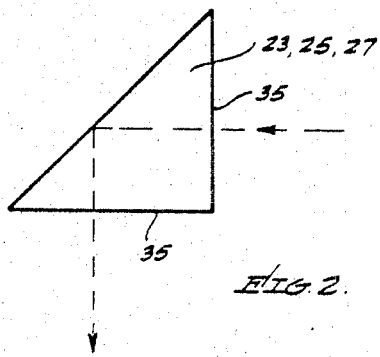
FIG. 2 illustrates one of the total internal reflection type mirrors used in connection with the rate of rotation sensor shown in FIG. 1.

As shown, the lower arm 13 includes a gain medium in the form of a laser 29, which in this case is a helium-neon (He-Ne) type emitting continuous radiation in a clockwise (CW) direction from a first end 31 and in a counterclockwise (CCW) direction from a second end 33. The gain medium could, of course, actually occupy all of the interferometer arms to help compensate for system losses. In each of the four corners of the interferometer configuration 11 is mounted a total internal reflection type mirror utilizing antireflection coatings 35 (see FIG. 2) at a 45° angle so that the CW light beam emitted from the first end 31 of the laser 29 is reflected into the second end 33 of the laser 29 and vice versa. In this way, the energy emitted by the laser 29 in one direction circulates around the system, returning to its source and continuing around the loop. But because the laser is emitting from both the first end 31 and the second end 33, there are two contrarotating beams flowing around the system.

Also included in the interferometer configuration 11 and in this case specifically shown in the upper arm 17 for simplicity is a reversible nonreciprocal optical phase shifter 37, the operation and function of which will be discussed later. For present purposes, however, the optical phase shifter provides controllable, reversible, nonreciprocal modes of operation in one of which the CCW light beam traverses an effective longer path length than the CW light beam. When the mode is reversed, the CW light beam travels the effective longer path length. The effect on the light beams in either mode is nonreciprocal as the differing path lengths for the CCW and CW light beams imply.

As shown in FIG. 1, the left arm 19 of the interferometer 11 includes a mode suppression filter 39 which may be desirable but, as will be explained subsequently, not absolutely essential for the proper operation of the invention. Again, as in the case of the phase shifter 37, the position of this element need not be in any specific arm of the system.

In the absence of the optical phase shifter 37, both contrarotating beams travel identical path lengths within the interferometer configuration 11 so long as it remains stationary, i.e., no angular velocity ($\Omega=0$). But if angular velocity is introduced to the system (rotation about an axis perpendicular to the plane of the contrarotating beams), the beam traveling in the direction of rotation will have a slightly greater distance to travel before returning to its point of origin, while the beam traveling in the other direction will have a slightly shorter distance to travel. From an over-simplified point of view, this can be understood in the sense that by the time light has traveled all the way around the loop the mirror from which it started has moved somewhat due to the rotation of the system. The result is the well-known Doppler frequency shift. For any given sensor configuration, this frequency shift is proportional to the rate of its rotation.

In order to sense the angular rate, if any, the frequency shift must be measured by gaining access to at least a portion of the contrarotating beams without interrupting the rotations of the beams. A simple means of accomplishing this is to provide that one of the corner mirrors, for example mirror 21, be a partially transmitting type, so that a small amount of the energy from the CW and CCW beams passes through the mirror 21 while the remainder is reflected and continues to circulate around the loop.

By the use of an additional total reflecting mirror 41, the CW beam is reflected in such a manner that both beams are caused to travel in the same direction and actually along the same path. For simplicity, however, the beams appear separate in the figure. These beams are then superimposed upon the photosensitive surface of a photomixer 43 where they are detected and heterodyned to produce an audio-frequency (beat) signal $f$ which is equal to twice the Doppler shift resulting from the rotation of the system. The output of the photomixer 43 is coupled to a digital control circuit 45 including a precision frequency counter CO, which is in turn coupled to a digital data processor 47 which includes count down counters CDA and CDB and a readout device R, as will be described. Thus, in the absence of the optical phase shifter 37 and accompanying circuitry, the angular rate is obtained by detecting the beat note or frequency $f$ between the frequencies of the beams which have a zero frequency difference for zero angular velocity leading to the mode-pulling problems discussed earlier. Also, at this point, the direction of rotation is not obtainable.

However, by the inclusion of the optical phase shifter 37 in the system as shown in FIG. 1, an initial frequency offset (with $\Omega=0$) is provided for the contrarotating beams to eliminate the problem of mode-pulling. Furthermore, by utilization of switching circuit 49 (described later), a method for indicating the sense of rotation is provided.

The reversible nonreciprocal optical phase shifter 37 (seen in detail in FIG. 3) is obtained by combining a first Faraday rotator 51 and a second Faraday rotator 53 with a doubly refracting crystal 55. The normal single mode of the laser 29 (with $\Omega=0$) is split into two modes corresponding to two beams having the same polarization traveling around the circuit in opposite directions. The optical path length for one is longer than for the other because each beam sees a different refractive index in the doubly refracting crystal 55. The zero (rotation) frequency separation of the two modes can easily be adjusted to a value which will ensure no interaction between the modes, still keeping both within the pass band of the mode suppression filter 39, if used. As an example, the separation may be between 10 megacycles (mc.) and 30 mc. The long and short paths can be reversed by reversing the directions of the magnetic fields on the Faraday rotators.

The two opposite configurations of the magnetic field H are called H1$f$ and H2$f$. The doubly refracting crystal is so arranged that the magnetic field H in the H1$f$ configuration, the CW beam has the shorter path and the CCW beam has the longer path. In the H2$f$ configuration of the magnetic field, this situation is reversed. The whole system may be rotating in either a CW or CCW direction, or may have zero angular velocity. The frequencies of each of the modes are considered under each of the six conditions shown in Table I and are represented graphically in FIGS. 4A through 4D.

TABLE I

Frequency Shifts Under Different Conditions

| Condition | $\Omega$ | H | Frequency (for cw and ccw beams) | Signals |
|---|---|---|---|---|
| 1 | 0 | H1$f$ | ccw ←—$f_1$—→ cw | A |
| 2 | 0 | H2$f$ | cw ←—$f_2$—→ ccw | B |
| 3 | cw | H1$f$ | ccw →$f_1$← cw | A |
| 4 | cw | H2$f$ | cw ←———$f_2$———→ ccw | B |
| 5 | ccw | H1$f$ | ccw ←———$f_1$———→ cw | A |
| 6 | ccw | H2$f$ | cw →$f_2$← ccw / $f_0$ | B |

The initial frequency offset caused by the differential phase shifter 37 in the H1$f$ and H2$f$ magnetic field configurations is shown for conditions 1 and 2. The manner in which the modes shift for different combinations of rotation and direction of magnetic fields is shown on the right. The sense of rotation can be obtained by comparing the values of the beat frequencies $f_1$ (A signals) and $f_2$ (B signals) obtained in the H1$f$ and H2$f$ configurations. If $f_1<f_2$ (the B signals are greater), $\Omega$ is CW; if $f_1>f_2$ (the A signals are greater) $\Omega$ is CCW ($f_1$ and $f_2$ are the beat frequencies between the modes, i.e., the difference frequencies).

As mentioned briefly before, the sense of rotation may be provided as an output from the digital data processor 47 by the utilization of the switching circuit 49. This circuit is coupled to the optical phase shifter 37 by means of lead 57 and provides complementary control signals H1$s$ and H2$s$ (as later described) to the phase shifter 37. By processes well known in the art and as described in connection with FIG. 3, hereinafter these signals cause the magnetic fields in the first Faraday rotator 51 and in the second Faraday rotator 53 to assume the reverse field configurations described heretofore during their respective time intervals.

In synchronism with the above-described switching operation, the switching circuit 49 also couples a second set of control signals H1$d$ and H2$d$ derived from the signals H1$s$ and H2$s$ to the digital control circuits 45 to control the count interval of counter CO and further couples respective pulses H1$p$ and H2$p$ also derived from signals H1$s$ and H2$s$ to the diigtal data processor 47 through a lead 59 to control transfer of the contents of the count down counters CDA and CDB to the readout device R.

The magnitude of the angular velocity can be obtained by finding the absolute difference between the beat frequencies $f_1$ and $f_2$. As one means of instrumentation, the values of the beat frequencies $f_1$ (A signals) and $f_2$ (B signals) are counted by the precision frequency counter CO of the digital control circuit 45 in the equal time intervals provided by the signals H1$d$ and H2$d$. The counter 45 is designed to integrate over sufficiently long equal periods provided by signals H1$d$ and H2$d$ for each of the frequencies $f_1$ and $f_2$ to minimize error and has an output coupled to the digital data processor 47 having the separate binary count down counters CDA and CDB. The high-low comparison may be made by comparing each beat frequency $f_1$ and $f_2$ with some arbitrary number, always larger than either. This gives the sense of rotation. The difference between $f_1$ and $f_2$ may be obtained by a digital subtraction, thus giving the magnitude of the angular velocity. Alternatively, circuits may be employed to directly compare the beat frequencies in the outputs of count down counters containing counts of the respective frequencies. During synchronous count down, the counter first to reach zero cuts off the other which then indicates which beat frequency was the larger and contains the magnitude of the difference of the beat frequencies. This alternative circuit is discussed in detail at a later point.

Either of the aforesaid arrangements has the advantage that the magnitude of the original splitting or frequency shifting caused by the differential phase shifter 37 appears in the counts of both $f_1$ and $f_2$ and is therefore counted out. This magnitude need only be large enough to ensure that the two modes will not interact with each other.

The operation of the nonreciprocal optical phase shifter 37 is explained in reference to FIG. 3. The plane of polarization of a light beam, when passing through a Faraday medium, is rotated when a magnetic field parallel to the direction of propagation is applied to the material. The absolute direction of rotation depends only on the direction of the magnetic field H and is independent of the direction of propagation. The amount of rotation is related to the strength of the magnetic field and the path length in the medium by the expression $$\theta = VHL_1 \qquad (4)$$

where:

$\theta \equiv$ angle of positive screw sense along the H field
$V \equiv$ Verdet's constant for the material
$H \equiv$ magnetic field strength
$L_1 \equiv$ length of the Faraday element.

The practical problem of designing a Faraday rotator depends upon finding a material with a Verdet constant large enough to produce 45° rotation with reasonable magnetic fields and low optical attenuation. Zinc sulfide is one usable material and has a Verdet constant of 0.22 min. cm.$^{-1}$ G$^{-1}$, which provides a rotation of 45° with a magnetic field of 3,100 gauss (G) for a 4 centimeter (cm.) length. Lead oxide glass is another Faraday material which may be used. It has a Verdet constant of 0.09 min. cm.$^{-1}$ G$^{-1}$ and is commercially available.

The differential path length is provided by the doubly refracting crystal 55 by arranging so that the planes of polarization of the contrarotating modes are oriented 90° to each other in this material. In these planes the crystal has different indices of refraction. This amount of differential phase shift is given by $$\phi = \beta \cdot L_2 \left[ \frac{1}{n_{11}} - \frac{1}{n_\perp} \right] \text{rad} \qquad (5)$$

where:

$\beta \cdot = \frac{2\pi}{\lambda_0}$ $L_2 \equiv$ length of doubly refracting crystal 55

$n_{11} \equiv$ index parallel to optic axis ($= 1.544$ for quartz)

$n_\perp \equiv$ index perpendicular to optic axis ($= 1.553$ for quartz)

Using a quartz crystal for the doubly refracting medium, a mode-splitting of 30 mc. at a center frequency of $3 \times 10^{14}$ cycles per second ($\lambda = 1\mu$), and a path length of 4 meters requires a crystal approximately 0.004 inch thick.

The mode suppression filter 39 is a mode suppressor of the type discussed by D. A. Kleinman and P. Kisliuk in an article "Discrimination against unwanted orders in the Fabry-Perot resonator," Bell System Technical Journal, 41 453 (1962). The invention is operable and accurate even without the use of this filter but even greater accuracy may be obtained in reading the magnitude of the angular velocity when it is part of the interferometer system. FIG. 4 shows the mode filter characteristic as dashed lines 71. FIG. 4A illustrates how the mode suppression filter 39 eliminates all natural laser modes 73, 74, 75, 77 except the desired mode 79 at a predetermined frequency $f_0$. Dashed lines 81 generally outlines what is commonly called the Doppler envelope connecting the peaks of the various natural modes. Note that only the lower portion of this characteristic is shown in parts (B), (C) and (D) of FIG. 4 because the frequency scale has been expanded in these parts with respect to part (A).

As noted earlier herein, angular rates or rates of rotation are detected by determining the difference between the beat frequencies $f_1$ and $f_2$. The direction in which rotation has taken place may be conveniently determined by simultaneously and synchronously counting down two counters containing counts of the beat frequencies and noting which of the two counters contains the larger count.

The circuit for accomplishing this is illustrated in FIG. 5. The timing diagrams depicting the operation of the circuit of FIG. 5 appear in FIG. 6. As will be recalled from the description with respect to Table I, H1$f$ and H2$f$ denote the magnetic fields in the two modes of operation, respectively, of the reversible nonreciprocal optical phase shifter 37 described with reference to FIG. 3. The signals H1$s$ and H2$s$ are used to control the production of fields H1$f$ and H2$f$ and therefore denote time intervals during which the phase shifter exists in its respective modes of operation. These intervals or periods may then be used, as indicated in Table I, to determine the respective subperiods in which counting of the respective beat frequencies (A and B signals) may occur. As a practical matter, the intervals in which beat frequency counting takes place are selected to be less than and to lie completely within the respective intervals determined by the signals H1$s$ and H2$s$.

Apparatus for accomplishing this character of operation may comprise a crystal oscillator, generally designated XO, which, as is well known, provides a very stable output frequency. This crystal oscillator may be utilized directly to drive a counter FDH or be coupled as input to a suitable clock pulse generator as shown, designated CPG, producing a clock pulse output, generally designated C$p$, coupled input-wise to the frequency divider FDH which, together with a flip-flop FFH on the output of the frequency divider FDH, provides the required equal magnitude time intervals referred to. The flip-flop FFH may be a separately controlled flip-flop, as shown herein in the interest of convenience, or may constitute the last stage of the frequency divider FDH.

Flip-flops such as the flip-flop FFH are of the standard bistable type having respective input terminals designated J and K and having respective output terminals, here designated H1 and H2, which produce complementary output voltage state signals. A pulse applied to the J input terminal of such a flip-flop triggers it to its "1" representing electrical state (true), and a pulse on the K input terminal triggers the flip-flop to its "0" representing electrical state (false). Flip-flops of this type are conventional. According to the convention adopted herein it will be assumed that a positive going voltage excursion or pulse is required on either of the two input terminals in order to achieve a changing state at the output terminals of the flip-flop. Additionally, according to the convention adopted herein the true or "1" representing electrical state of the flip-flop exists when that terminal (H1) controlled by the J input terminal of the flip-flop is in the higher of its two voltage states and is in its false or "0" representing electrical state when that output terminal (H2) controlled by the K input terminal of the flip-flop is in the higher of its two voltage states. The simultaneous application of pulses to both J and K input terminals causes the flip-flop to change its electrical state. Flip-flops of this type are assumed throughout the system. J–K flip-flops are discussed in Logical Design of Digital Computers by Montgomery Phister, Jr. at p. 128. A transistorized flip-flop usable herein is described in Digital Computer Components and Circuits by R. K. Richards at p. 161 in reference to FIGS. 4–12A.

The frequency divider FDH comprises a conventional cascaded connection of flip-flops such as the flip-flop FFH to provide the required time interval for switching of the optical phase shifter. Such a time interval may be of the order of 200 milliseconds for a 30 mc. beat frequency separation (zero rotation). The output signals of the flip-flop FFH are voltage state signals identified H1$s$ and H2$s$ as seen in FIG. 6 immediately beneath the clock pulse $Cp$. These two voltage state output signals are coupled inputwise to a conventional switching circuit, generally designated SC, the output of which is coupled to the optical phase shifter 37 to provide switching of the character described hereinabove. Thus, the signals H1$s$ and H2$s$ define the intervals in which the optical phase shifter exists in its respective magnetic states.

The counting interval is initiated by the signals H1$d$ and H2$d$. These signals are essentially the signals H1$s$ and H2$s$ delayed and are produced by respective conventional delay circuits D1 and D2 which have their inputs coupled to the terminals H1 and H2 of the flip-flop FFH to be respectively energized by the signals H1$s$ and H2$s$. Thus, the initiation of each delayed count interval is synchronized with the interval signals H1$s$ and H2$s$. The signals H1$d$ and H2$d$ are depicted in FIG. 6. According to the convention adopted herein the positive going excursion of the signals H1$d$ and H2$d$ is used to denote the beginning of the count interval in each instance and as shown is several counts removed (delayed) from the positive going excursion of the respective signals H1$s$ and H2$s$.

The count interval is determined by a frequency divider FDC which like the frequency divider FDH may comprise a plurality of cascaded flip-flops of the J–K type arranged to provide a count interval initiated by the respective signals H1$d$ and H2$d$ and terminating prior to the time that the respective signals H1$s$ and H2$s$ switch from the higher of their two voltage states to the lower. The voltage state output of the frequency divider which may comprise flip-flops FC1 through FC$n$ (not shown) is denoted $\overline{C}ns$, which for the flip-flop designation utilized and again according to conventional practice, denotes the voltage state signal at the "0" output terminal $\overline{C}n$ of the most significant flip-flop, FC$n$, as indicated in FIG. 5. This voltage state signal is depicted in FIG. 6. When the counter has completed a count, this flop-flop output terminal $\overline{C}n$ and consequently the signal $\overline{C}ns$ is in the higher of its two voltage states as indicated. Midway in the count the most significant flip-flop switches to its "1" representing electrical state at which point this output terminal and the signal $\overline{C}ns$ switches to the lower of its two voltage states, as shown, in which it remains until the frequency divider cycles from its maximum count to zero, at which point it switches to the higher of its two voltage states.

A counter flip-flop FFC is utilized to control a conventional binary coded decimal counter CO. The terminal $\overline{C}n$ of the frequency divider FDC is coupled to the K input terminal of the counter flip-flop FFC. Flip-flop FFC is normally set by the set-reset pulse which is coupled to its J input terminal so that the C output terminal of the flip-flop FFC is in the higher of its two voltage states to enable an "and" gate AGC controlling the input to the counter CO. The positive going excursion of the signals $\overline{C}ns$ at the time the flip-flops of the frequency divider FDC all go to zero, in keeping with the convention adopted herein, switches the flip-flop FFC to its "0" representing electrical state in which the output terminal C is switched to the lower of its two voltage states, operating to disable the "and" gate AGC and thus end the count interval. The gates employed herein are conventional diode types of "and" and "or" gates and are discussed in Chapter 2 beginning on p. 36 of Digital Computer Components and Circuits, supra. Such gates are also discussed in Logical Design of Digital Computers, supra, beginning on p. 21. In this latter reference, Chapter 3 on Boolean algebra employs the gate symbols employed in the drawings of this application. In the patent to Nelson 2,803,401, FIGS. 23 and 24, and the disclosure relating thereto, the gating of clock pulses is described.

The frequency divider FDC is controlled by an "and" gate AG1. One input terminal of the "and" gate AG1 is enabled by the output of an "or" gate OG1 having as its two inputs the signals H1$d$ and H2$d$. A second input terminal of "and" gate AG1 receives the clock pulse $Cp$ and a third input terminal of the "and" gate AG1 received another enabling input derived from an "or" gate OGC having coupled to its respective inputs the respective "1" output terminals, C1–C$n$, of all of the flip-flops FC1–FC$n$ (not shown) of the frequency divider FDC. Thus, as long as the frequency divider FDC is in other than its zero count electrical state, the output of the "or" gate OGC operates to enable the corresponding input terminal of the "and" gate AG1. The flip-flops of the frequency divider FDC may be reset or switched to their "0" states by means of a reset signal which is manually coupled thereto for the purpose of initially zeroing the frequency divider. A similar reset signal circuit may be coupled to all of the other flip-flops of the system to set them in predetermined electrical states as required. The least significant flip-flop of the frequency divider FDC is set to its "1" representing electrical state by the set-reset pulse. This pulse is provided by the output of a conventional diode type of positive signal "or" gate OG2 the two input circuits of which are respectively capacitor coupled to the terminals H1 and H2 of the flip-flop FFH to be energized by the respective signals H1$s$ and H2$s$. Thus, the set-reset pulse, for the convention adopted herein, is a positive going pulse (not shown) which is synchronized with each positive going excursion of the respective signals H1$s$ and H2$s$. The timing of this pulse is the same as that of the respective pulses H1$p$ and H2$p$ depicted in FIG. 6 and will be understood in that connection.

The output of "or" gate OG1 is also coupled to an input terminal of the counter "and" gate AGC and thus operates along with the output of the counter flip-flop FFC to enable the counter "and" gate. Thus, at such time as the set-reset pulse switches the flip-flop FFC so that its C output terminal is in the higher of its two voltage states the counter "and" gate AGC is only partially enabled. Complete enabling, permitting counting of pulses produced by a pulse former PF1, is achieved at such time as one of the signals H1$d$ or H2$d$ exists in the higher of its two voltage states which determines the beginning of the count interval as described.

The operation of the photomixer 43 was described at an earlier point, in which reference was made to the production of the beat frequencies $f_1$ and $f_2$ in each of the two switching modes of operation of the optical phase shifter or interferometer 37. The output of the photomixer is coupled input-wise to the pulse former circuit PF1 which may conventionally comprise a capacitor-coupled transistor circuit providing output pulses of a desired character for driving the binary coded decimal counter CO. Here, again, the set-reset pulse is provided to reset all of the flip-flops of the counter so that the counter exists in its zero count electrical configuration with the beginning of each new count interval determined by signals H1$s$ or H2$s$.

When "and" gate AGC is enabled the output pulses provided by the pulse former PF1 are coupled to the input circuit of the counter CO and the pulse counting operation begins. The pulse counting operation ends when the flip-flop FFC is switched to its "0" electrical state. The actual count interval and the idealized characteristic of the output of the "and" gate AGC are depicted in FIG. 6 and identified by the signal AGC$s$. As will be seen, these count intervals are of exactly the same length and, hence, time and the actual count counted by the counter depends upon the relative magnitudes of the beat frequencies $f_1$ and $f_2$. The count relating to beat frequency $f_1$, which occurs during the time interval determined by signal H1$s$, for the purpose of convenience of identification, is herein designated the "A" count, while the count of the beat frequency $f_2$ taking place during the time interval determined by the signal H2$s$ is herein identified the "B" count.

The counter CO is a conventional binary coded decimal counter and, as indicated hereinabove, also includes flip-flops of the J–K variety coupled so that the counter counts in binary decimal code. For this purpose, the counter is conventionally divided into binary coded decimal decades, here identified as extending from the units decade to the ($n$) decade. Each decade will conventionally comprise four flip-flops capable of counting in binary code from 1 through 10, in keeping with conventional practice, and then resetting to begin the count again. The number of stages required will vary with the beat frequency and the time intervals during which counting of the particular beat frequencies takes place.

Provision is made at the end of each count interval to switch or transfer the contents of the counter CO to respective count down counters CDA and CDB. For this purpose at the end of the count interval determined by the signal H1s, the transfer pulse H2p which now goes positive is utilized to enable suitable logical gating circuits, designated LGA, to transfer the contents of the counter CO to a conventional count down counter CDA. This gating is conventionally organized to transfer the signals from the respective flip-flops of the counter CO to corresponding flip-flops in the count down counter CDA so that the exact count of the counter CO exists in the setting of the flip-flops of the count down counter CDA. Thereafter, with the next occurrence of the set-reset pulse all of the flip-flops of the counter CO are set to zero and this counter is ready for another counting cycle, occurring during the interval determined by the signal H2s, which now proceeds in the manner described hereinabove for the signal H1s. At the end of this count interval the signal H1s swings in a positive direction and the signal H1p now goes positive to transfer the contents of the count accumulated during the H2s interval via the logical gate LGB to a second count down counter CDB. Thus, the A signals are in one counter CDA and the B signals are in a second counter CDB.

The count down counters CDA and CDB are controlled by means of a clock pulse gated by an "and" gate AG2 so that simultaneous synchronous count down takes place. The "and" gate AG2 is enabled by the outputs of respective "or" gates OGA and OGB, the inputs of which are the all "1's" outputs of the respective flip-flops of the respective count down counters CDA and CDB. Thus, as long as any one of the flip-flops of these respective count down counters is in its "1" representing electrical state the "or" gate OGA or OGB associated with that flip-flop will be enabled. Hence, both gates are enabled whenever the contents (other than zero) of the binary coded decimal counter CO for each of the intervals H1s and H2s have been transferred thereto. With enabling of "or" gates OGA and OGB, the "and" gate AG2 is enabled, gating clock pulses Cp so that synchronous count down takes place. At such time as one of the counters is counted to zero the "and" gate AG2 is disabled and count down stops on both counters. At this point the count remaining in that counter which has not reached zero indicates the difference between the beat frequencies (angular rate) and at the same time indicates the direction of rotation.

This count is now transferred to the numerical display section of a readout device, generally designated R. Such a numerical display section, by way of example, may be a conventional Nixie indicator providing a decimal number readout based upon the binary coded decimal input. Commonly, each decade of such devices comprises 10 number-shaped, gas-filled tubes. There are as many decades as there are decades in the number to be displayed. The contents of only that counter which has not been counted down to zero are transferred. To this end the output of that "or" gate which has gone to zero (assume the counter CDB was counted down to zero for this purpose) is instrumental in enabling the connected "and" gate. For the assumed condition, when the output of the "or"gate OGB swings to the lower of its two electrical states with the occurrence of all zeros in the count down counter CDB a signal is generated by an inverter IB which is coupled input-wise to the enabling terminal of "and" gate AGB, the output of which is coupled to a logical gating circuit LGA1 and operates as an enabling potential. The other input terminal of the "and" gate AGB is the clock pulse Cp. Thus, at the time the enabling voltage appears on the "and" gate AGB, the next occurring clock pulse produces an enabling pulse on the logical gates LGA1. The remaining input terminals of the logical "and" gates LGA1 individually comprise the outputs of the flip-flops of the count down counters CDA; hence, upon the occurrence of the enabling voltage at the input of the gate LGA1 the electrical states (1's and 0's) of the flip-flops of the counter CDA are transferred to the numerical display device. At the same time the output of the inverter IB is coupled to an enabling terminal of an "and" gate AGB1, the output of which is utilized to produce a visible signal at the section of the read-out device marked CCW. By reference to Table I it will be seen that at such time as the A signals are larger than the B signals, which is the case here since the count down counter CDB went to zero, the rotation of the electromagnetic sensor about its input axis has been counterclockwise.

If the counter CDA had been counted down to zero ahead of the counter CDB during the synchronous count down interval, the output of the "or" gate OGA would have disabled the "and" gate AG2 and thus inhibited further application of count down clock pulses to the inputs of the respective count down counters. At the same time, the output of the inverter IA would have inhibited the "and" gate AGA, the output of which in turn would have enabled the gates LGB1 to effect transfer of the contents of the count down counter CDB to the numerical display section of the readout device R. Similarly, the output of the inverter IA would have enabled the "and" gate AGA1, the output of which would have activated the visual indicator CW denoting that the electromagnetic sensor had been rotating in a clockwise direction. If the counters CDA and CDB have identical counts, they reach zero count simultaneously. "And" gates AGA and AGB simultaneously gate clock pulses to gates LGA1 and LGB1 which now simultaneously gate all zeros to the numerical display section of the readout device R. Both direction indicators CW and CCW are turned on and then promptly turned off by the signals AGB1d and AGA1d which are developed by the respective delay circuits D4 and D5 responsive respectively to the signals AGA1s and AGB1s.

At the end of each readout operation, the counters CDA and CDB are reset by a counter reset signal CRs produced by a counter reset circuit CR. This circuit comprises a delay circuit D3 controlled by a reset "or" gate OGR having as its two inputs the "and" gate signals or pulses AGA1s and AGB1s. Thus, after a brief delay the reset singal CRs sets the two count down counters CDA and CDB to their zero count configuration.

From the foregoing, it will be evident that there is achieved an extremely accurate self-contained electromagnetic rotation sensor capable of measuring very slow angular rotation and the direction thereof and which is free of mode-pulling effects.

Although a specific preferred embodiment has been illustrated, it will be appreciated that other organizations of the specific arrangement may be made within the spirit and scope of the invention. Additionally, other components or elements may be substituted for those which have been particularly named.

Accordingly, it is intended that the foregoing disclosure and drawings be considered only as illustrations of the principles of this invention and are not to be considered in a limiting sense.

What is claimed is:

1. A rotation rate sensor comprising:
   interferometer means having a closed optical loop adapted to be rotated in a clockwise or a counterclockwise direction and having a coherent light energy source coupled to said optical loop for producing two coherent light energy beams traveling in clockwise and counterclockwise directions, respectively, around said optical loop;

electrically reversible optical phase shifter means in said closed optical loop for reversibly changing the effective optical path length traversed by one of said light beams with respect to the other to provide a reversible frequency offset between said clockwise and said counterclockwise light beams;

light beam energy sampling means including a photomixer coupled to said optical loop for combining at least a portion of the energy of said clockwise and counterclockwise light beams and producing a signal having a frequency proportional to the difference in frequency between said clockwise and said counterclockwise light beams;

pulse former means coupled to said light beam energy sampling means for producing a pulse train having a pulse repetition rate proportional to the frequency of said signal;

timing signal means for producing a clockwise timing signal and a counterclockwise timing signal, in sequence, coupled to said phase shifter for reversing said phase shifter;

time delayed start count signal means coupled to said timing signal means and responsive to said clockwise timing signal and said counterclockwise timing signal for producng respective delayed start count signals;

end count signal means coupled to said start count signal means and responsive to both of said start count signals for producing an end count signal for each start count signal;

counter means coupled to said pulse former means, to said start count signal means and to said end count signal means for counting the pulses of said pulse train;

respective storage circuits;

respective logic circuits coupling said counter to both of said storage circuits;

respective transfer count signal circuits coupled to said timing signal means and responsive to said clockwise and counterclockwise timing signals respectively and coupled to said logic circuits respectively for enabling said logic circuits synchronously with said clockwise and said counterclockwise timing signals, respectively, to transfer the count of said counter means to one and then the other of said storage means; and display circuit means coupled to both of said storage circuits and controlled thereby for displaying the difference between the counts of said storage circuits and indicating which one of said storage circuits has the greater count.

2. Apparatus as set forth in claim 4 in which said end count signal means comprises a frequency diivder counter and gating means controlled by said frequency divider counter and said start count signals.

3. Apparatus as set forth in claim 4 wherein said display circuit means comprises a display device and respective gates having input circuits coupled to the output circuits of said storage circuits respectively and having output circuits commonly coupled to said display device, and respective gates enabling circuits cross coupled between the output circuits of said storage circuits and the input circuits of said gates.

4. Apparatus as set forth in claim 4 in which said storage circuits are count down counters.

References Cited

UNITED STATES PATENTS 3,134,837   5/1964   Kisluik et al. _____ 331—94.5

OTHER REFERENCES

Electromag. Angular Rotation Sensing, Sperry Gyroscope Co., Sperry Repart #AB–1108–0016–1, September 1963, pp. 4–1 to and including 4–5 relied on.

JEWELL H. PEDERSEN, *Primary Examiner.*

B. LACOMIS, *Assistant Examiner.*

UNITED STATES PATENT OFFICE
CERTIFICATE OF CORRECTION

Patent No. 3,392,622                                    July 16, 1968

Henry R. Senf

It is certified that error appears in the above identified patent and that said Letters Patent are hereby corrected as shown below:

Column 2, lines 45 and 60, "v", in italics, each occurrence, should read -- v --. Column 3, line 15, "Maasers" should read -- Masers --; line 22, "effect" should read -- effects --. Column 5, line 56, "zero (rotation)" should read -- (zero rotation) --; line 67, after "that" insert -- with --. Column 12, line 55, "singal" should read -- signal --. Column 14, lines 15, 19 and 27, the claim reference numeral "4", each occurrence, should read -- 1 --.; line 16, "diivder" should read -- divider --.

Signed and sealed this 27th day of January 1970.

(SEAL)
Attest:

Edward M. Fletcher, Jr.                          WILLIAM E. SCHUYLER, JR.
Attesting Officer                                     Commissioner of Patents